(12) United States Patent  
Matsumoto et al.

(10) Patent No.: US 8,528,411 B2  
(45) Date of Patent: Sep. 10, 2013

(54) ELASTIC MATERIAL FOR PRESSURE MEASUREMENT AND PRESSURE MEASURING DEVICE

(75) Inventors: Yoshikazu Matsumoto, Kanagawa (JP); Mitsuru Sawano, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 155 days.

(21) Appl. No.: 13/074,427

(22) Filed: Mar. 29, 2011

(65) Prior Publication Data

US 2011/0232390 A1    Sep. 29, 2011

(30) Foreign Application Priority Data

Mar. 29, 2010 (JP) .................. 2010-076446

(51) Int. Cl.  
*G01L 7/08* (2006.01)

(52) U.S. Cl.  
USPC ........................................................ 73/715

(58) Field of Classification Search  
None  
See application file for complete search history.

(56) References Cited

U.S. PATENT DOCUMENTS

| 5,098,755 A * | 3/1992 | Tanquary et al. ............ 428/35.5 |
| 2004/0030032 A1 * | 2/2004 | Manabe et al. ............... 524/502 |
| 2007/0056377 A1 * | 3/2007 | Matsubara ...................... 73/718 |

FOREIGN PATENT DOCUMENTS

| JP | 5-59756 | 8/1993 |
| JP | 9-43080 A | 2/1997 |
| JP | 2007-218892 A | 8/2007 |
| JP | 2008-525804 A | 7/2008 |
| WO | 2006/071690 A1 | 7/2006 |

* cited by examiner

*Primary Examiner* — Andre Allen  
(74) *Attorney, Agent, or Firm* — Sughrue Mion, PLLC

(57) ABSTRACT

An elastic material for pressure measurement, containing an elastic resin composition having at least either a urethane bond or a urea bond and being obtained by reacting an isocyanate with (A) a linear polyol and then curing the obtained prepolymer with use of a curing agent having two —NH$_2$ groups in one molecule.

13 Claims, 5 Drawing Sheets

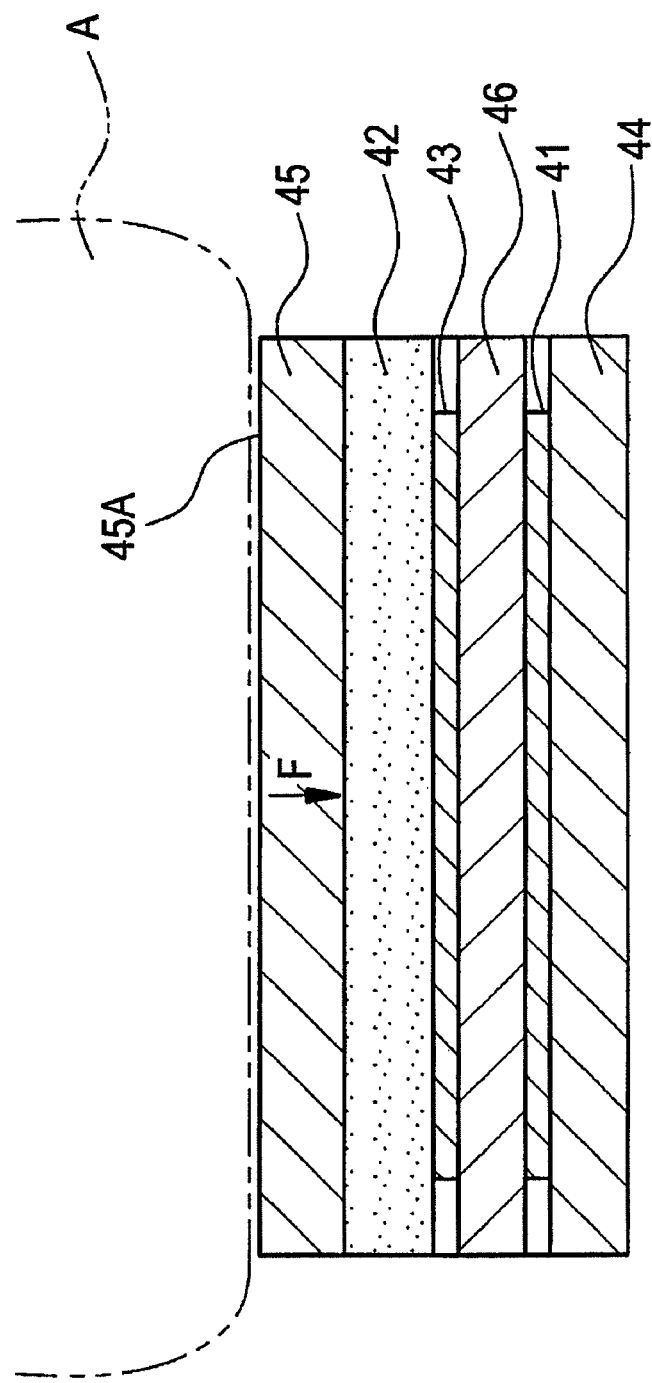

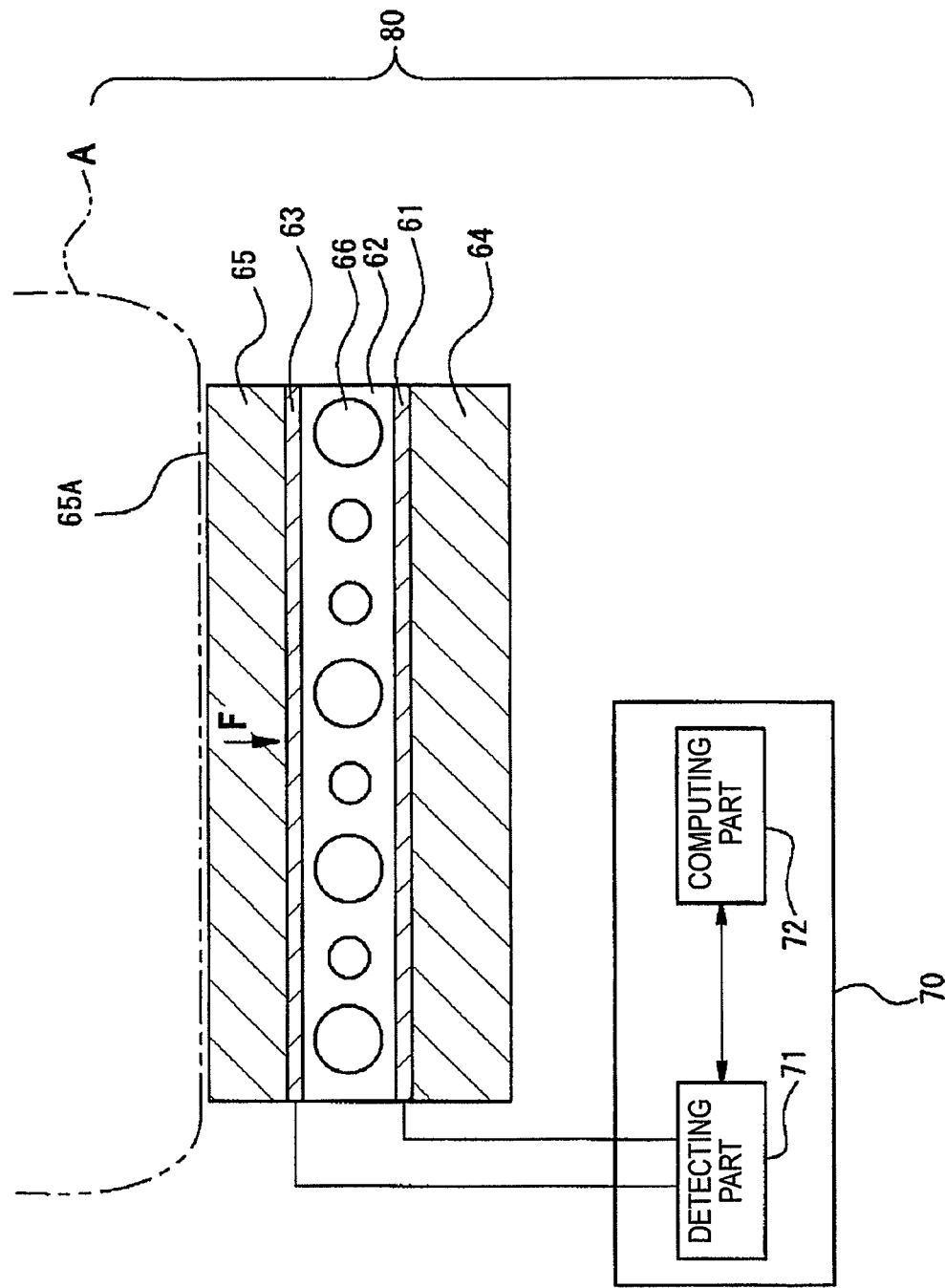

ELASTIC MATERIAL FOR PRESSURE MEASUREMENT AND PRESSURE MEASURING DEVICE

BACKGROUND OF THE INVENTION

1. Field of the Invention

The present invention relates to an elastic material for pressure measurement and a pressure measuring device.

2. Description of the Related Art

Various pressure measuring devices for detecting a pressure are known.

For example, JP-A-9-43080 (the term "JP-A" as used herein means an "unexamined published Japanese patent application") discloses a pressure-sensitive sensor performing the measurement by utilizing a phenomenon that a dielectric layer composed of a rubber elastic body is elastically deformed by a pressure and the electrostatic capacity is thereby changed, wherein specific physical properties of the dielectric layer are specified to specific ranges. It is stated that according to this technique, a pressure-sensitive sensor capable of measuring the pressure and the weight with high accuracy can be obtained without complicating the structure.

Also, JP-A-2007-218892 discloses a pressure distribution detector comprising a plurality of drive coils, a plurality of detection coils electromagnetically coupled with the plurality of drive coils in pairs respectively, spacer units for keeping a constant distance between the plurality of drive coils and the plurality of detection coils, variable electromagnetic coupling units formed of an electrical conductor or a magnetic material and provided movably in the vicinity of the drive coil and/or the detection coil, a drive circuit for driving the drive coil, and a detection circuit for detecting a change in the electromagnetic coupling between the drive coil and the detection coil, from the detection coil. It is stated that according to this technique, a pressure distribution detector less susceptible to the installation environment of the device and reduced in the adverse effect on detection sensitivity or detection accuracy of the pressure distribution even when fitted not only to a flat surface but also to a surface having an arbitrary shape such as curved surface, can be obtained.

Furthermore, in JP-A-2008-525804 and JP-UM-A-5-59756 (the term "JP-UM-A" as used herein means an "unexamined published Japanese utility model application"), a technique of detecting a pressure based on the change in the electric resistance value attributable to the compressive deformation of an electrically conductive film (sheet), which is generated with application of a pressure, is disclosed.

SUMMARY OF THE INVENTION

There has been a problem that when a large pressure is applied to a conventional elastic sheet for pressure measuring devices, a residual compressive strain is sometimes produced in the elastic sheet and this does not allow the elastic sheet to return to the initial state (particularly, the initial state in terms of thickness) before application of the pressure, as a result, accurate pressure measurement cannot be performed any more.

The present invention has the task of solving those conventional problems and achieving the following object.

That is, an object of the present invention is to provide an elastic material for pressure measurement, which enables obtaining a pressure measuring device assured of accuracy and excellent reproducibility of pressure measurement, and a pressure measuring device and a pressure measuring method, each using the elastic material.

The present invention has the following configurations.

<1> An elastic material for pressure measurement, containing an elastic resin composition having at least either a urethane bond or a urea bond and being obtained by reacting an isocyanate with (A) a linear polyol to form a prepolymer and then curing the prepolymer with use of a curing agent having two —$NH_2$ groups in one molecule.

<2> The elastic material for pressure measurement as claimed in <1> above, wherein the curing agent is 3,3'-dichloro-4,4'-diaminodiphenylmethane.

<3> The elastic material for pressure measurement as claimed in <1> or <2> above, wherein the isocyanate is tolylene diisocyanate.

<4> The elastic material for pressure measurement as claimed in any one of <1> to <3> above, wherein the polyol (A) is a linear polyether or a linear polyester.

<5> The elastic material for pressure measurement as claimed in any one of <1> to <4> above, wherein the polyol (A) is polytetramethylene ether glycol, polybutylene adipate or polyhexane adipate.

<6> The elastic material for pressure measurement as claimed in any one of <1> to <5> above, wherein in addition to the polyol (A), (B) a linear polyol shorter in the chain than the polyol (A) is further reacted with the isocyanate.

<7> The elastic material for pressure measurement as claimed in <6> above, wherein the polyol (B) is glycol.

<8> A pressure measuring device comprising:
a pair of electrodes,
the elastic material for pressure measurement claimed in any one of <1> to <7> above, which is provided between the pair of electrodes and is elastically deformable according to a pressure, and
a measuring part which measures the pressure based on the electrostatic capacity between the pair of electrodes.

<9> A pressure measuring device comprising:
a drive wire,
a detection wire,
the elastic material for pressure measurement claimed in any one of <1> to <7> above, which is provided between the drive wire and the detection wire and is elastically deformable according to a pressure,
a drive part which applies a drive voltage to the drive wire, and
a measuring part which measures the pressure based on the induced voltage from the detection wire, obtained by electromagnetic coupling between the drive wire and the detection wire.

<10> A pressure measuring device comprising:
a pair of electrodes,
an elastic part being provided between the pair of electrodes and containing the elastic material for pressure measurement claimed in any one of <1> to <7> and an electrically conductive particle, and
a measuring part which measures the pressure based on the resistance value between the pair of electrodes.

<11> A pressure measuring method comprising:
using
a pair of electrodes and
the elastic material for pressure measurement claimed in any one of <1> to <7> above, which is provided between the pair of electrodes and is elastically deformable according to a pressure, and
measuring the pressure based on the electrostatic capacity between the pair of electrodes.

<12> A pressure measuring method comprising:
using
a drive wire,
a detection wire,
the elastic material for pressure measurement claimed in any one of <1> to <7> above, which is provided between the drive wire and the detection wire and is elastically deformable according to a pressure and a drive part which applies a drive voltage to the drive wire, and measuring the pressure based on the induced voltage from the detection wire, obtained by electromagnetic coupling between the drive wire and the detection wire.

<13> A pressure measuring method comprising:

using a pair of electrodes and an elastic part being provided between the pair of electrodes and containing the elastic material for pressure measurement claimed in any one of <1> to <7> above and an electrically conductive particle, and measuring the pressure based on the resistance value between the pair of electrodes.

The present invention can provide an elastic material for pressure measurement, which enables obtaining a pressure measuring device assured of accuracy and excellent reproducibility of pressure measurement, and a pressure measuring device and a pressure measuring method, each using the elastic material.

BRIEF DESCRIPTION OF THE DRAWINGS

FIG. 5 is a schematic cross-sectional view showing the pressure measuring device according to a third embodiment of the present invention;

FIG. 6 is a schematic cross-sectional view showing the pressure measuring device according to a fourth embodiment of the present invention;

Figure 1:
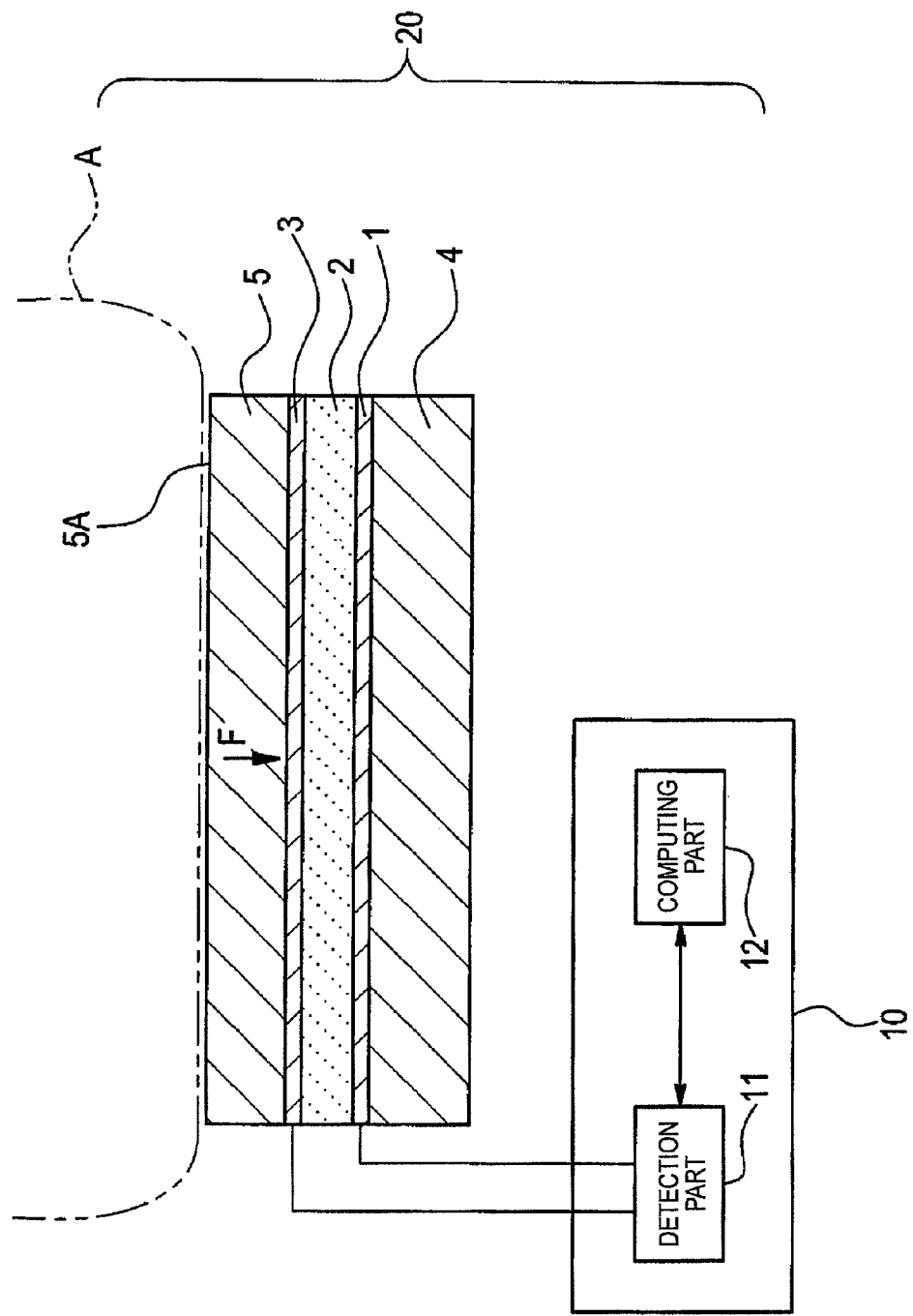
FIG. 1 is a schematic cross-sectional view showing the pressure measuring device according to a first embodiment of the present invention.

wherein 1, 3, 61, 63 denote First electrode and second electrode (a pair of electrodes), 2, 22, 42, 62 denote Elastic material for pressure measurement, 10, 30, 50, 70 denote Measuring part, 21, 41 denote Drive wire, 23, 43 denote Detection wire, 33, 53 denote Drive part, 4, 24, 44, 64 denote Base material, 5, 25, 45, 65 denote Pressing part, 20, 40, 60, 80 denote Pressure measuring device, and 66 denotes Electrically conductive particle.

DETAILED DESCRIPTION OF THE INVENTION

[Elastic Material for Pressure Measurement]

The elastic material for pressure measurement according to an embodiment of the present invention is described below.

The elastic material for pressure measurement according to an embodiment of the present invention contains an elastic resin composition having at least either a urethane bond or a urea bond and being obtained by reacting an isocyanate with (A) a linear polyol to obtain a prepolymer and then curing the prepolymer with use of a curing agent having two —NH$_2$ groups in one molecule.

The isocyanate is not particularly limited as long as it is a compound capable of reacting with the polyol (A) to form a prepolymer, and a diisocyanate is usually used. A compound having a molecular weight of 80 to 1,000 is preferred, and a compound having a molecular weight of 100 to 500 is more preferred. The isocyanate preferably has a structure where two —NCO groups is bonded on one aromatic ring. Examples of the isocyanate include tolylene diisocyanate, 4,4'-diphenylmethane diisocyanate, carbodiimide-modified 4,4'-diphenylmethane diisocyanate, polymeric 4,4'-diphenylmethane diisocyanate (polymeric MDI), toluidine diisocyanate, naphthylene diisocyanate, hexamethylene diisocyanate, isophorone diisocyanate, xylylene diisocyanate, hydrogenated xylylene diisocyanate and dicyclohexylmethane diisocyanate, with tolylene diisocyanate being preferred.

The polyol (A) is preferably a polyol having a molecular weight of 100 to 10,000, more preferably a molecular weight of 300 to 7,000, still more preferably a molecular weight of 500 to 5,000.

Examples of the polyol (A) include a polyether polyol such as polytetramethylene ether glycol, polypropylene ether glycol and polyethylene ether glycol, a copolyether polyol thereof, a polyester polyol obtained from a dibasic acid such as adipic acid, maleic acid, itaconic acid, malonic acid, succinic acid and hexahydroterephthalic acid and a glycol such as ethylene glycol, propylene glycol, butanediol, hexanediol and dimethylolcyclohexane, a polyether diol, and a polycarbonate diol.

The polyol (A) is preferably a linear polyether or a linear polyester, more preferably polytetramethylene ether glycol, polybutylene adipate or polyhexane adipate.

The polyol (A) is linear, whereby the elastic material is presumed to be improved in its strain characteristics.

The prepolymer is preferably a prepolymer obtained by mixing the isocyanate and the polyol (A) and bonding them under heating. The heating is performed preferably at 50 to 150° C., more preferably at 60 to 100° C., and preferably for 1 to 60 minutes, more preferably for 5 to 20 minutes.

The prepolymer is preferably a prepolymer obtained by further reacting, as a chain extender, (B) a linear polyol shorter in the chain length than the polyol (A) with the isocyanate, in addition to the polyol (A). The polyol (B) is preferably a glycol, more preferably a glycol having a carbon number of 2 to 9, and a short chain diol such as ethylene glycol, 1,2-propylene glycol, 1,3-propylene glycol, 1,3-butylene glycol, 1,4-butanediol, 1,5-pentanediol, 1,6-hexanediol, methylpentanediol and neopentyl glycol, or a short chain triol such as glycerin can be used.

The structure of the polyol (B) is the same as that of polyol (A) and includes those having a smaller molecular weight as described above. The type of the polyol (B) used may be the same as or different from the polyol (A).

In the case of using the polyol (B), the amount used thereof is preferably, in terms of mass ratio, from 0.001 to 10 times, more preferably from 0.1 to 0.5 times, based on the polyol (A).

As for the curing agent, compounds having two —NH$_2$ groups in one molecule and being capable of bonding to the prepolymer by reacting with the —NCO group therein can be widely used, and a compound having a molecular weight of 50 to 1,000 is preferred.

Examples of the curing agent include ethylenediamine, trimethylene di-p-aminobenzoate, 1,4-phenylenediamine, 2,6-diaminotoluene, 1,5-naphthalenediamine, 3,3'-dichloro-4,4'-diaminodiphenylmethane (MOCA), 1-methyl-3,5-bis(methylthio)-2,6-diaminobenzene, 1,-methyl-3,5'-diethyl-2,6-diaminobenzene, 4,4'-methylene-bis-(3-chloro-2,6-diethylaniline), 4,4'-methylene-bis-(2,3-dichloroaniline), trimethylene glycol-di-para-aminobenzoate, 4,4'-methylene-bis-(2,6-diisopropylaniline) and 4,4'-diaminodiphenylsulfone.

As the curing agent, those having a phenylamino group substituted with a halogen atom (preferably chlorine atom) (—$C_6H_3$—$NH_2$, wherein X is a halogen atom) are preferred, and those having a 3-chloro-4-aminophenyl group are more preferred.

The mixing ratio of the prepolymer and the curing agent is preferably (number of active hydrogen atoms contained in the curing agent)/(number of active NCO groups contained in the prepolymer)=from 0.70 to 1.0, and the ratio is more preferably from 0.75 to 0.95, still more preferably from 0.80 to 0.90.

The elastic resin composition is obtained by adding the curing agent to the prepolymer and effecting curing. The curing is performed by mixing the prepolymer and the curing agent, and heating or the like is not required, but heating may be performed. In the case of performing the heating, the mixture is preferably heated at 50 to 100° C. for 1 to 60 minutes.

The elastic material for pressure measurement contains the above-described elastic resin composition and, if desired, other components, for example, may contain an elastic resin composition other than that described above, a catalyst, a dehydrating agent, a plasticizer, a weather resistant agent such as ultraviolet absorber, a dye, a pigment, a defoaming agent, and the later-described electrically conductive particle. These other components may be mixed and dispersed or the like before the elastic resin composition is heated and cured, and then the mixture may be cured. The content of the elastic resin composition in the elastic material for pressure measurement is preferably from 20 to 100 mass %, more preferably from 50 to 100 mass %. In the case of containing the electrically conductive particle, its content in the elastic material for pressure measurement is preferably from 20 to 70 mass %.

In the case where the elastic material for pressure measurement is applied particularly to a sheet-like pressure measuring device, the elastic material for pressure measurement is preferably in a film form.

As for the method to produce such a film-shaped elastic material for pressure measurement, any known method may be employed but, for example, a liquid composition containing the above-described resin composition, those additives used, if desired, and a solvent is injected into a forming mold and solidified, whereby the film-shaped elastic material can be easily obtained.

The elastic material for pressure measurement according to an embodiment of the present invention has the above-described configuration. Thanks to this configuration, when a large pressure is applied, a residual compressive strain is hardly produced in the elastic sheet. Accordingly, even if the pressure is thereafter removed, the elastic material for pressure measurement more unfailingly returns to the initial state (particularly, the initial state in terms of thickness) before application of the pressure and can be an elastic material for pressure measurement, which enables obtaining a pressure measuring device excellent in the reproducibility of pressure measurement.

[Pressure Measuring Device]

The pressure measuring device according to an embodiment of the present invention is described in detail below.

As shown in the schematic cross-sectional view of FIG. 1, the pressure measuring device 20 according to a first embodiment of the present invention has a configuration where a base material 4, a first electrode 1, the elastic material 2 for pressure measurement according to the above-described embodiment of the present invention, a second electrode 3 and a pressing part 5 are stacked in this order. Also, the pressure measuring device 20 has a measuring part 10 which measures the pressure based on the electrostatic capacity between the first electrode 1 and the second electrode 3. More specifically, the measuring part 10 has a detection part 11 electrically connected to each of the first electrode 1 and the second electrode 3, and a computing part 12 capable of signal transmission with the detection part 11.

When an object A is placed on a contact surface 5A of the pressing part 5 and a pressure F is applied, the elastic material 2 for pressure measurement is elastically deformed (more specifically, the thickness of the elastic material 2 for pressure measurement is reduced) and the electrostatic capacity between the first electrode 1 and the second electrode 3 is changed. The detection part 11 detects the electrostatic capacity and transmits the obtained detection value signals to the computing part 12. The computing part 12 is storing in advance the data relevant to the correspondence relationship between the pressure and the variation of the electrostatic capacity and measures the pressure F by computation based on the data and the detection value signals of the electrostatic capacity transmitted from the detection part 11.

Figure 2:
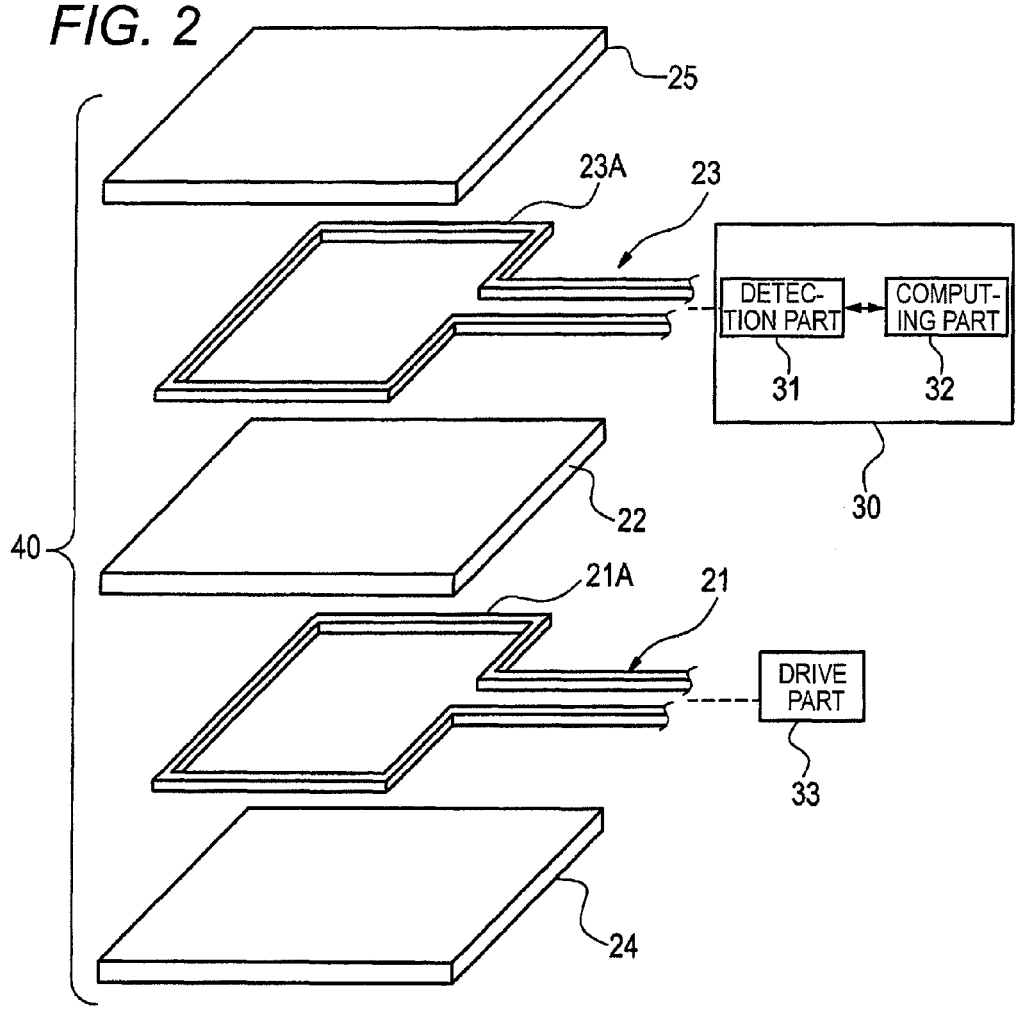
FIG. 2 is an exploded perspective view showing the pressure measuring device according to a second embodiment of the present invention.
Figure 3:
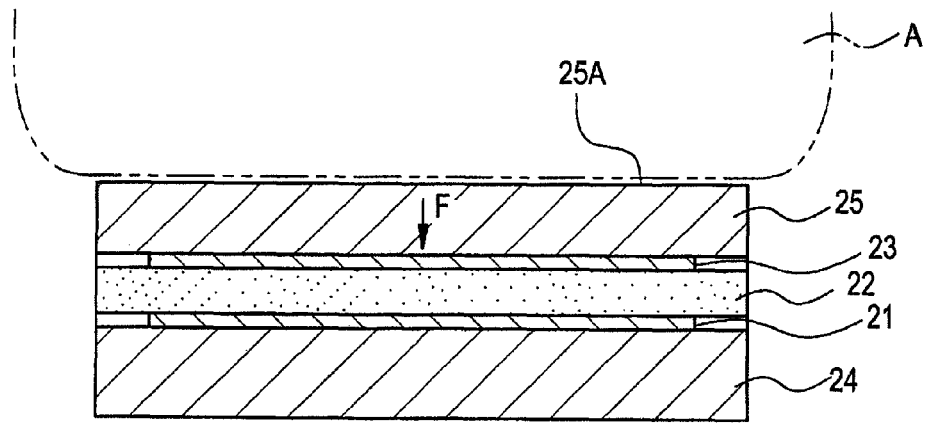
FIG. 3 is a schematic cross-sectional view showing the pressure measuring device according to a second embodiment of the present invention.

As shown in the exploded perspective view of FIG. 2 and the schematic cross-sectional view of FIG. 3, the pressure measuring device 40 according to a second embodiment of the present invention has a configuration where a base material 24, a drive wire 21, the elastic material 22 for pressure measurement according to the above-described embodiment of the present invention, a detection wire 23 and a pressing part 25 are stacked in this order.

The drive wire 21 has a drive coil 21A, and the detection wire 23 has a detection coil 23A. Here, the drive wire 21 and the detection wire 23 are disposed by arranging the drive coil 21A and the detection coil 23A to face each other through the elastic material 22 for pressure measurement.

The pressure measuring device 40 has a drive part 33 which applies a drive voltage to the drive wire 21. The drive part is preferably an AC power source.

Also, the pressure measuring device 40 has a measuring part 30 which measures the pressure based on the induced voltage from the detection wire 23, obtained by electromagnetic coupling between the drive wire 21 and the detection wire 23. More specifically, the measuring part 30 has a detection part 31 electrically connected to the detection wire 23 and a computing part 32 capable of signal transmission with the detection part 31.

When the drive part 33 applies a drive voltage to the drive wire 21, an induced voltage is generated from the detection wire 23 due to electromagnetic coupling between the drive coil 21A and the detection coil 23A.

In this state, an object A is placed on a contact surface 25A of the pressing part 25 and a pressure F is applied, as a result, the elastic material 22 for pressure measurement is elastically deformed (more specifically, the thickness of the elastic material 22 for pressure measurement is reduced). In turn, the degree of electromagnetic coupling between the drive coil 21A and the detection coil 23A is changed and with this change, the induced voltage from the detection wire 23 is also changed. The detection part 31 detects the induced voltage and transmits the obtained detection value signals to the computing part 32. The computing part 32 is storing in advance the data relevant to the correspondence relationship between the pressure and the variation of the induced voltage and measures the pressure F by computation based on the data and the detection value signals of the induced voltage transmitted from the detection part 31.

Figure 4:
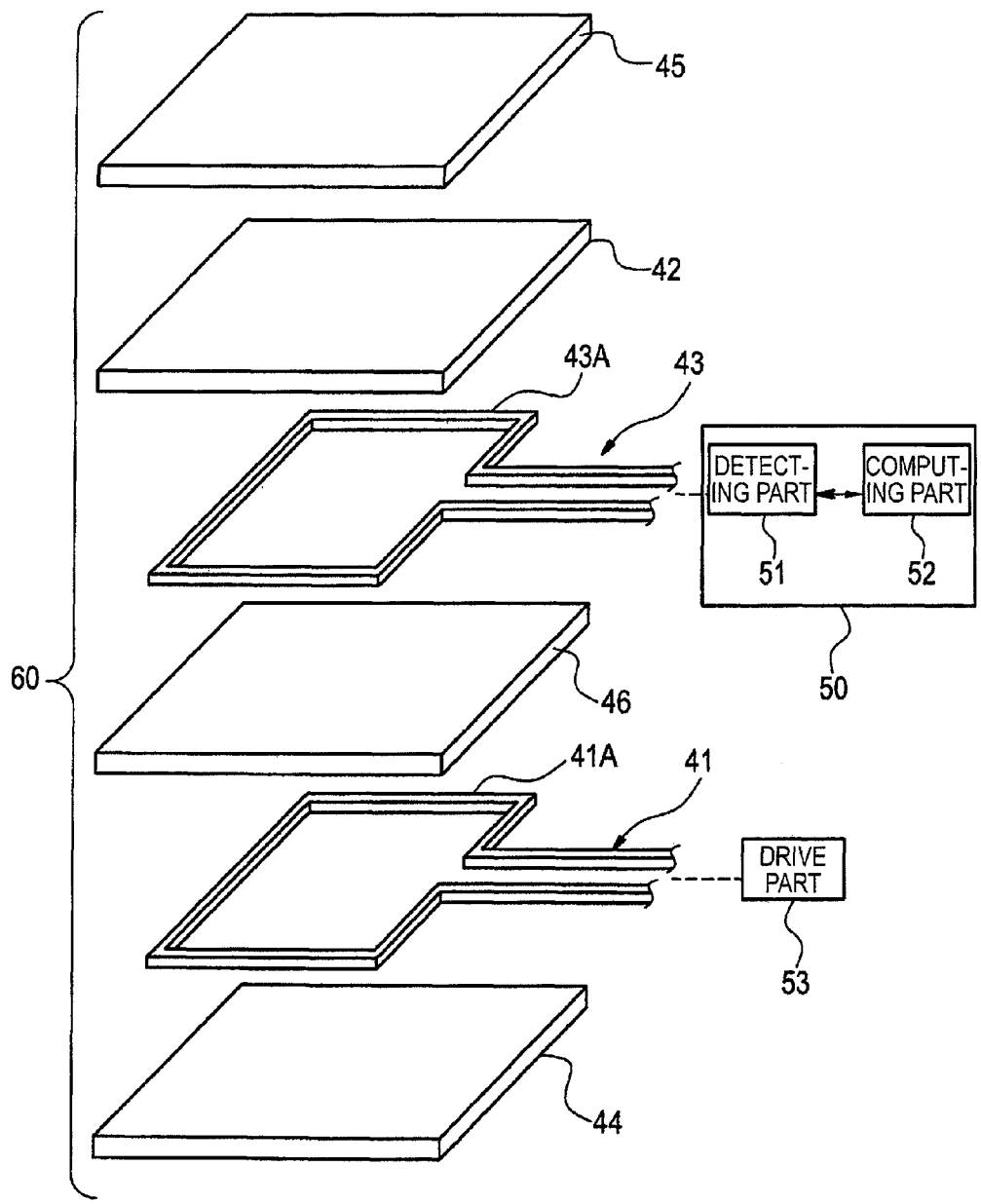
FIG. 4 is an exploded perspective view showing the pressure measuring device according to a third embodiment of the present invention.

As shown in the exploded perspective view of FIG. 4 and the schematic cross-sectional view of FIG. 5, the pressure measuring device 60 according to a third embodiment of the present invention has a configuration where a base material 44, a drive wire 41, a spacer 46, a detection wire 43, the elastic material 42 for pressure measurement according to the above-described embodiment of the present invention, and a pressing part 45 are stacked in this order. Thanks to such a configuration, the drive wire 41 and the detection wire 43 are disposed apart from each other at a predetermined distance (corresponding to the thickness of the spacer 46).

The drive wire 41 has a drive coil 41A, and the detection wire 43 has a detection coil 43A. Here, the drive wire 41 and the detection wire 43 are disposed by arranging the drive coil 41A and the detection coil 43A to face each other through the spacer 46. The material of the spacer 46 is not particularly limited, but an inelastic material is usually used and examples thereof include a polyethylene terephthalate (PET) substrate, a polyimide substrate and a glass epoxy substrate. Incidentally, the spacer 46 may be a flexible substrate, if desired.

The pressing part 45 is constituted as a variable electromagnetic coupling part capable of changing the degree of electromagnetic coupling between the drive wire 41 and the detection wire 43 upon pressing and is not particularly limited as long as such an action is developed, and this part is composed of, for example, an electrical conductor (preferably in a sheet form, for example, an aluminum foil) or a magnetic material (preferably in a sheet form). The pressing part 45 is suitably formed, for example, by laminating a previously produced sheet on the elastic material 42 for pressure measurement or by depositing a compound such as electrical conductor or magnetic material in a sheet form on the elastic material 42 for pressure measurement.

The pressure measuring device 60 has a drive part 53 which applies a drive voltage to the drive wire 41.

Also, the pressure measuring device 60 has a measuring part 50 which measures the pressure based on the induced voltage from the detection wire 43, obtained by electromagnetic coupling between the drive wire 41 and the detection wire 43. More specifically, the measuring part 50 has a detection part 51 electrically connected to the detection wire 43 and a computing part 52 capable of signal transmission with the detection part 51.

Similarly to the second embodiment, when the drive part 53 applies a drive voltage to the drive wire 41, an induced voltage is generated from the detection wire 43 due to electromagnetic coupling between the drive coil 41A and the detection coil 43A.

In this state, an object A is placed on a contact surface 45A of the pressing part 45 and a pressure F is applied, as a result, the elastic material 42 for pressure measurement is elastically deformed (more specifically, the thickness of the elastic material 42 for pressure measurement is reduced). When the pressing part 45 as a variable electromagnetic coupling part comes close to the detection wire 43 in this way, the degree of electromagnetic coupling between the drive coil 41A and the detection coil 43A is changed and with this change, the induced voltage in the detection wire 43 is also changed. The detection part 51 detects the induced voltage and transmits the obtained detection value signals to the computing part 52. The computing part 52 is storing in advance the data relevant to the correspondence relationship between the pressure and the variation of the induced voltage and measures the pressure F by computation based on the data and the detection value signals according to the induced voltage transmitted from the detection part 51.

As shown in the schematic cross-sectional view of FIG. 6, the pressure measuring device 80 according to a fourth embodiment of the present invention has a configuration where a base material 64, a first electrode 61, an elastic part composed of the elastic material 62 for pressure measurement according to the above-described embodiment of the present invention and an electrically conductive particle 66, a second electrode 63 and a pressing part 65 are stacked in this order. The electrically conductive particle 66 in a state of a pressure being not applied is kept apart from at least one electrode. The electrically conductive particles may be arrayed in the planar direction as shown in FIG. 4 or may be dispersed in the thickness direction. Also, as shown in FIG. 4, particles differing in the particle diameter may mixed and used. The pressure measuring device 80 has a measuring part 70 which measures the pressure based on the resistance value between the first electrode 61 and the second electrode 63. More specifically, the measuring part 70 has a detection part 71 electrically connected to each of the first electrode 61 and the second electrode 63, and a computing part 72 capable of signal transmission with the detection part 71.

In a state of a pressure being not applied, two electrodes are separated by the elastic part, and the detection part 71 reads a high resistance value. When an object A is placed on a contact surface 65A of the pressing part 65 and a pressure F is applied, the elastic material 62 for pressure measurement is elastically deformed (more specifically, the thickness of the elastic material 62 for pressure measurement is reduced) and this causes electrically conductive particles 66 to approach each other or the electrically conductive particle 66 to approach the first electrode 61 and the second electrode 63, as a result, an electricity can be conducted between two electrodes through the electrically conductive particle 66. As the pressure F causing one particle to approach both electrodes becomes larger, the elastic material 62 for pressure measurement undergoes greater elastic deformation and the resistance value decreases. In view of enhancing the accuracy, it is preferred that electricity is conducted between two electrodes through one particle, in other words, the particles are dispersed to allow only one particle to exist in the thickness direction (the direction in which the pressure is applied). Also, by planarly dispersing particles differing in the particle diameter, a resistance value in inverse proportion to the pressure F is liable to be obtained. The detection part 71 detects the resistance value and transmits the obtained detection value signals to the computing part 72. Here, instead of the resistance value, an electric quantity such as voltage and current may be measured. The computing part 72 is storing in advance the data relevant to the correspondence relationship between the pressure and the resistance value and measures the pressure F by computation based on the data and the detection value signals of the resistance value transmitted from the detection part 71.

The electrically conductive particle 66 is not particularly limited as long as it has electrical conductivity, and this particle may be, for example, a particle composed of an electrically conductive material, or a particle obtained by coating a core composed of an electrically nonconductive material with an electrically conductive material, and may be solid or hollow. The electrically conductive material may be a metal or an organic electrically conductive substance or may be an electrically conductive resin. The core composed of an electrically nonconductive material is not particularly limited, and examples thereof include an electrically nonconductive resin particle, a glass particle, a ceramic particle and a carbon particle. The material may also be the above-described elastic material for pressure measurement of the present invention.

The electrically conductive or nonconductive particle may or may not be spherical or may be a short fiber or an amorphous particle. As the electrically conductive or nonconductive particle, those having an aspect ratio of 1:1 to 1:30 are preferred, and those having a particle diameter of 0.1 μm to 5 mm or a particle diameter of 0.001 to 0.9 times the distance between two electrodes are preferred.

In the foregoing pages, the pressure measuring devices 20, 40, 60 and 80 according to the first to fourth embodiments are described, but an arbitrary layer may be interposed between respective layers of the stack for the pressure measuring device, within the range not affecting the effects of the present invention.

In the pressure measuring devices 40 and 60 according to the second and third embodiments, a coil-shaped wire is exemplified for each of the drive wire and the detection wire, but as long as electromagnetic coupling is possible, the wire form is not limited to a coil shape and may be a linear shape.

Furthermore, the pressure measuring devices 20, 40, 60 and 80 according to the first to fourth embodiments are described as a single device for measuring a pressure F but are not limited thereto. That is, a pressure distribution measuring device using a plurality of these pressure measuring devices is also included in the scope of the present invention.

The pressure distribution measuring device includes, for example, a device where a large number of pressure measuring devices are arranged in an array manner in the row and column directions and a pressing region formed by gathering the pressing parts of respective pressure measuring devices is assigned to serve as the contact surface with an object used for pressure measurement, thereby making it possible to measure the pressure distribution of the object.

In the pressure measuring devices 20, 40, 60 and 80 according to the first to fourth embodiments, as described above, the elastic materials 2, 22, 42 and 62 for pressure measurement have a characteristic feature that a residual compressive strain is scarcely produced in the elastic sheet when given a large pressure upon receiving a pressure and the elastic material for pressure measurement unfailingly returns to the initial state (particularly, the initial state in terms of thickness) before application of the pressure.

Thanks to such a characteristic feature, the pressure measuring devices 20, 40, 60 and 80 can be a pressure measuring device capable of rapidly measuring the pressure with high accuracy and excellent in the lifetime.

EXAMPLES

The present invention is described in greater detail below by referring to Examples.

Elastic Material for Pressure Measurement

Example 1

Sample A

Polytetramethylene ether glycol (PTMG; PTG-1000 produced by Hodogaya Chemical Co., Ltd., number average molecular weight: 1,000), 1,4-butanediol (1,4-BG, produced by Nacalai Tesque, Inc.) and tolylene diisocyanate (TDI) were mixed in a molar ratio of 1:1:3, and this mixed solution was heated at 75° C. for 11 minutes to prepare an isocyanate group-terminated prepolymer. This prepolymer and 3,3'-dichloro-4,4'-diaminodiphenylmethane (MOCA; CUAMINE MT, produced by Ihara Chemical Industry Co., Ltd.,) as a curing agent were mixed and flowed into a forming mold to obtain polyurethanepolyurea. The mixing ratio between the isocyanate-terminated prepolymer and the curing agent was adjusted by (NCO:active hydrogen=1.0:0.90 [molar ratio]). The TDI content of the formed product was 4.1 mass %. The formed product was cut into a 20 mm-square size, and a test of measuring the thickness change was performed using one sheet. The thickness measured by a micrometer was 1.91 mm, and the hardness according to JIS-A was 95.

Example 2

Sample C

Polyhexane adipate (PHA), 1,4-butanediol (1,4-BG, produced by Nacalai Tesque, Inc.) and tolylene diisocyanate (TDI) were mixed in a molar ratio of 1:1:3, and this mixed solution was heated at 75° C. for 7 minutes to prepare an isocyanate group-terminated prepolymer. This prepolymer and 3,3'-dichloro-4,4'-diaminodiphenylmethane (MOCA; CUAMINE MT, produced by Ihara Chemical Industry Co., Ltd.,) as a curing agent were mixed and flowed into a forming mold to obtain polyurethanepolyurea. The mixing ratio between the isocyanate-terminated prepolymer and the curing agent was adjusted by (NCO:active hydrogen=1.0:0.90 [molar ratio]). The TDI content of the formed product was 4.1 mass %. The formed product was cut, into a 20 mm-square size, and a test of measuring the thickness change was performed using one sheet. The thickness measured by a micrometer was 1.92 mm, and the hardness according to JIS-A was 90.

Comparative Example 1

Sample B

Polypropylene glycol (PPG), 1,4-butanediol (1,4-BG, produced by Nacalai Tesque, Inc.) and tolylene diisocyanate (TDI) were mixed in a molar ratio of 1:1:3, and this mixed solution was heated at 75° C. for 11 minutes to prepare an isocyanate group-terminated prepolymer. This prepolymer and 3,3'-dichloro-4,4'-diaminodiphenylmethane (MOCA; CUAMINE MT, produced by Ihara Chemical Industry Co., Ltd.,) as a curing agent were mixed and flowed into a forming mold to obtain polyurethanepolyurea. The mixing ratio between the isocyanate-terminated prepolymer and the curing agent was adjusted by (NCO:active hydrogen=1.0:0.90 [molar ratio]). The TDI content of the formed product was 4.6 mass %. The formed product was cut into a 20 mm-square size, and a test of measuring the thickness change was performed using one sheet. The thickness measured by a micrometer was 1.84 mm, and the hardness according to JIS-A was 90.

Comparative Example 2

A formed product of foamed silicone rubber SSR930N (produced by Kureha Elastomer Co., Ltd.) was cut into a 20 mm-square size, and a test of measuring the thickness change was performed using one sheet. The thickness measured by a micrometer was 2.9 mm, and the hardness by means of ASKER C was 35.

Comparative Example 3

A formed product of silicone rubber TSE270-5U (produced by Momentive Performance Materials Inc.) was cut into a 20 mm-square size, and a test of measuring the thickness change was performed using one sheet. The thickness measured by a micrometer was 1.0 mm, and the hardness according to JIS-A was 50.

Comparative Example 4

A formed product of ultrathin silicone rubber SC50NNS (produced by Kureha Elastomer Co., Ltd.) was cut into a 20 mm-square size, and a test of measuring the thickness change was performed using three sheets. The total thickness of three sheets measured by a micrometer was 0.31 mm, and the hardness according to JIS-A was 52.

Comparative Example 5

A formed product of ultrathin silicone rubber SC30 (produced by Kureha Elastomer Co., Ltd.) was cut into a 20 mm-square size, and a test of measuring the thickness change was performed using three sheets. The total thickness of three sheets measured by a micrometer was 0.27 mm, and the hardness according to JIS-A was 30.

Comparative Example 6

A formed product of silicone rubber SR60 (produced by Kureha Elastomer Co., Ltd.) was cut into a 20 mm-square size, and a test of measuring the thickness change was performed using three sheets. The total thickness of three sheets measured by a micrometer was 0.25 mm, and the hardness according to JIS-A was 60.

Comparative Example 7

A formed product of fluororubber FB780N (produced by Kureha Elastomer Co., Ltd.) was cut into a 20 mm-square size, and a test of measuring the thickness change was performed using one sheet. The total thickness of one sheet measured by a micrometer was 1.0 mm, and the hardness according to JIS-A was 80.

Comparative Example 8

A formed product of nitrile rubber NB270N (produced by Kureha Elastomer Co., Ltd.) was cut into a 20 mm-square size, and a test of measuring the thickness change was performed using one sheet. The total thickness of one sheet measured by a micrometer was 1.0 mm, and the hardness according to JIS-A was 80.

Incidentally, the polyol in the elastic material of Comparative Example 1 is not linear, and the rubber of Comparative Examples 2 to 8 does not have a urethane/urea bond.

With respect to the materials of Examples and commercially available materials, the residual strain was evaluated as follows. The results are shown in Table 1.

Test Method:

The test was performed using a fatigue tester, Instron 8802 (manufactured by Instron, installed at Kanagawa Industrial Technology Center).

The samples of both Examples and Comparative Examples each was cut into a 20-mm square, and the specimen was sandwiched with aluminum plates and pressurized. The pressure was controlled to make the output value of the load cell constant, and the position of the press platen was measured. From the value obtained, the change of position measured under the same pressurization conditions by using only aluminum plates without the specimen therebetween was subtracted to thereby calculate the thickness of the specimen.

The specimen rated A when the percentage of change in the thickness was less than 10%, rated B when from 10% to less than 20%, and rated C when 20% or more.

Pressurization Conditions

Examples 1 and 2 and Comparative Examples 1 and 4 to 8

The specimen was held at 2 MPa for 60 seconds, then held at 5 MPa for 60 seconds, further held at 10 MPa for 60 seconds, and held for 60 seconds without load.

Comparative Example 2

The specimen was held at 2 MPa for 60 seconds and then held for 60 seconds without load.

Comparative Example 3

The specimen was held at 2 MPa for 60 seconds, held for 60 seconds without load, then held at 5 MPa for 60 seconds, held for 60 seconds without load, further held at 10 MPa for 60 seconds, and held for 60 seconds without load.

<Temperature Conditions>

Normal temperature (30° C.)

TABLE 1

| | Name, Model Number | Rubber Hardness (catalogue value) (no mark is Type A) | Permanent Compressive Strain (catalogue value) | Residual Strain Ratio | |
|---|---|---|---|---|---|
| Example 1 | A | 95 | 76% (100° C., 22 h) | A | thermosetting |
| Example 2 | C | 90 | 56% (100° C., 22 h) | A | polyurethane of |
| Comparative Example 1 | B | 90 | 72% (100° C., 22 h) | B | Nippon Polyurethane |
| Comparative Example 2 | SSR930N | 35 (ASKER C) | | B (after loading of 2 MPa) | foamed silicone rubber of Kureha |
| Comparative Example 3 | TSE270-5U | 50 | 9% (180° C., 22 h) | C | silicon rubber of Momentive |
| Comparative Example 4 | SC50NNS | 52 | | C | ultrathin silicone rubber of Kureha |
| Comparative Example 5 | SC30 | 30 | | C | |

TABLE 1-continued

| | Name, Model Number | Rubber Hardness (catalogue value) (no mark is Type A) | Permanent Compressive Strain (catalogue value) | Residual Strain Ratio | |
|---|---|---|---|---|---|
| Comparative Example 6 | SR60 | 60 | | C | |
| Comparative Example 7 | FB780N | 80 | 23% (200° C., 24 h) | B | fluororubber of Kureha |
| Comparative Example 8 | NB270N | 70 | 22% (100° C., 24 h) | B | nitrile rubber of Kureha |

As a result of evaluation, in the elastic materials for pressure measurement of Examples 1 and 2, the residual compressive strain was small when received a pressure. Therefore, according to the elastic material for pressure measurement of Example 1, 2, even if the pressure is thereafter removed, the elastic material for pressure measurement more unfailingly returns to the initial state (particularly, the initial state in terms of thickness) before application of the pressure, so that a pressure measuring device excellent in the reproducibility of pressure measurement can be obtained.

On the other hand, in the elastic materials for pressure measurement of Comparative Examples 1 to 8, the residual strain was large, and it was revealed that even when such an elastic material for pressure measurement is used, a pressure measuring device excellent in the reproducibility of pressure measurement can be hardly obtained.

The entire disclosure of each and every foreign patent application from which the benefit of foreign priority has been claimed in the present application is incorporated herein by reference, as if fully set forth.

What is claimed is:

1. An elastic material for pressure measurement, containing an elastic resin composition having at least either a urethane bond or a urea bond and being obtained by reacting an isocyanate with (A) a linear polyol to form a prepolymer and then curing the prepolymer with use of a curing agent having two —$NH_2$ groups in one molecule.

2. The elastic material for pressure measurement as claimed in claim 1, wherein the curing agent is 3,3'-dichloro-4,4'-diaminodiphenylmethane.

3. The elastic material for pressure measurement as claimed in claim 1, wherein the isocyanate is tolylene diisocyanate.

4. The elastic material for pressure measurement as claimed in claim 1, wherein the polyol (A) is a linear polyether or a linear polyester.

5. The elastic material for pressure measurement as claimed in claim 1, wherein the polyol (A) is polytetramethylene ether glycol, polybutylene adipate or polyhexane adipate.

6. The elastic material for pressure measurement as claimed in claim 1, wherein in addition to the polyol (A), (B) a linear polyol shorter in the chain than the polyol (A) is further reacted with the isocyanate.

7. The elastic material for pressure measurement as claimed in claim 6, wherein the polyol (B) is glycol.

8. A pressure measuring device comprising:
a pair of electrodes,
the elastic material for pressure measurement claimed in claim 1, which is provided between the pair of electrodes and is elastically deformable according to a pressure, and
a measuring part which measures the pressure based on the electrostatic capacity between the pair of electrodes.

9. A pressure measuring device comprising:
a drive wire,
a detection wire,
the elastic material for pressure measurement claimed in claim 1, which is provided between the drive wire and the detection wire and is elastically deformable according to a pressure,
a drive part which applies a drive voltage to the drive wire, and
a measuring part which measures the pressure based on the induced voltage from the detection wire, obtained by electromagnetic coupling between the drive wire and the detection wire.

10. A pressure measuring device comprising:
a pair of electrodes,
an elastic part being provided between the pair of electrodes and containing the elastic material for pressure measurement claimed in claim 1 and an electrically conductive particle, and
a measuring part which measures the pressure based on the resistance value between the pair of electrodes.

11. A pressure measuring method comprising:
using
a pair of electrodes and
the elastic material for pressure measurement claimed in claim 1, which is provided between the pair of electrodes and is elastically deformable according to a pressure, and
measuring the pressure based on the electrostatic capacity between the pair of electrodes.

12. A pressure measuring method comprising:
using
a drive wire,
a detection wire,
the elastic material for pressure measurement claimed in claim 1, which is provided between the drive wire and the detection wire and is elastically deformable according to a pressure and
a drive part which applies a drive voltage to the drive wire, and
measuring the pressure based on the induced voltage from the detection wire, obtained by electromagnetic coupling between the drive wire and the detection wire.

13. A pressure measuring method comprising:
using
a pair of electrodes and
an elastic part being provided between the pair of electrodes and containing the elastic material for pressure measurement claimed in claim 1 and an electrically conductive particle, and
measuring the pressure based on the resistance value between the pair of electrodes.

* * * * *